Jan. 10, 1967    D. R. PLUMMER    3,296,883
CONTROL DEVICES
Filed Feb. 3, 1964    2 Sheets-Sheet 1
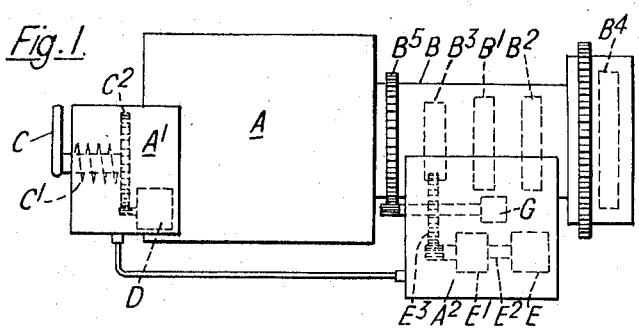
Fig.1.
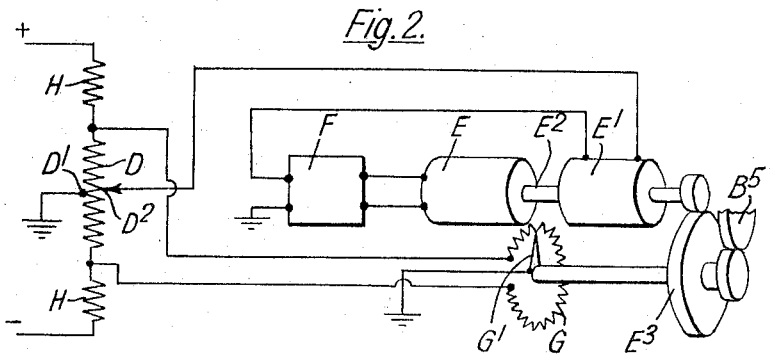
Fig.2.
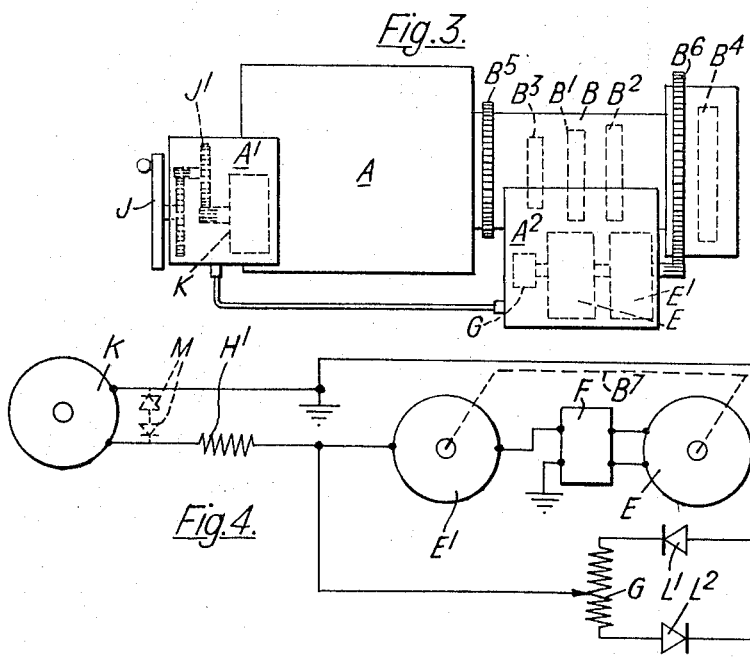
Fig.3.
Fig.4.
Inventor
D. R. Plummer
By
Holcomb, Wetherill & Brisbois
Attorneys

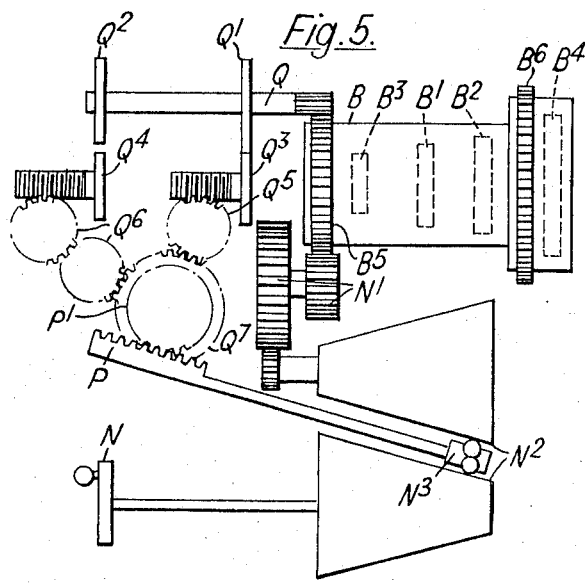
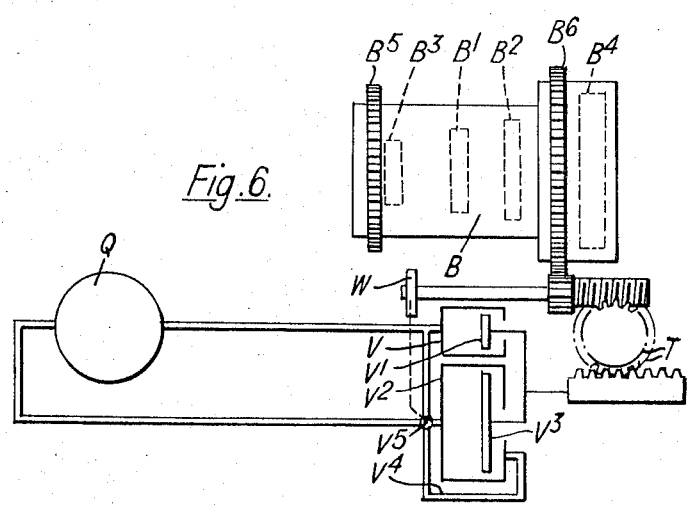

United States Patent Office 3,296,883
Patented Jan. 10, 1967

3,296,883
CONTROL DEVICES
Dexter R. Plummer, Leicester, England, assignor to Rank Precision Industries Limited, trading as The Rank Organisation Rank Taylor Hobson Division, Leicester, England, a British company
Filed Feb. 3, 1964, Ser. No. 341,967
Claims priority, application Great Britain, Feb. 5, 1963, 4,640/63
16 Claims. (Cl. 74—472)

This invention relates to a control device wherein movement of a demand element controls movement of a driven member having a limited range of travel in each of two opposite directions. Usually, although not essensntially, the demand element is constituted by a hand control movable at will by an operator, whilst the movement of the driven member is usually but not essentially effected by means deriving its power, at least partly, from a source other than the demand element.

Control devices of the above-described kind are known wherein the demand element acts to control the speed of movement of the driven member, and often, in such a device, the position of the driven member may not be immediately determinable from the position of the demand element, so that the driven member may be brought to an end of its range of travel at high speed. This is disadvantageous in that impact with an end stop at such high speed may result in damage, either to the driven member itself or to the transmission through which the driving force is imparted to such driven member.

The object of the present invention is to provide a control device wherein this disadvantage is substantially avoided.

The control device according to the present invention comprises transmission means acting under the control of the demand element to control the speed of movement of the driven member in either direction, and feed-back means responsive to the position of the driven member and acting to control an effective transmission ratio in the transmission means in such a manner as to cause the driven member to decelerate from the demanded velocity at least to a relatively small velocity at the end portions of its range of travel.

The feed-back means preferably acts, at each end portion of the range of travel of the driven member, to control only the effective transmission ratio governing movement of the driven member in the direction towards the extreme end of such portion, and does not substantially affect the effective transmission ratio governing return movement of the driven member in the direction towards the remote end of its range of travel. With this arrangement, when the driven member is located at either end portion of its range of travel, such member remains substantially fully responsive to the demand element when movement is called for towards the remote end of such range. For example, the transmission means may include a transmission device having two uni-directional transmission parts by means of which the speed of movement is controlled respectively in the two opposite directions, whilst the feed-back means acts at one end portion of the range of travel to control the effective transmission ratio of one unidirectional part of such transmission device whilst not affecting the effective transmission ratio of the second part, and acts at the other end portion of the range of travel to control the effective transmission ratio of the second unidirectional part of such transmission device whilst not affecting the effective transmission ratio of the first part.

In one arrangement, the transmission means comprises an electrical device responsive to the position of the demand element on either side of a zero position thereof and providing a voltage output dependent on such position, and an electrically energised prime-mover for driving the driven member and whose speed is dependent on a voltage derived from the voltage output of the electrical transmission under the control, at least at the end portions of the range of travel, of the feed-back means. For example, such electrical transmission device may conveniently comprise a demand potentiometer having a contact movable on either side of a zero position tapping in accordance with the position of the demand element and giving a voltage output dependent on such position, the movable contact of such potentiometer being urged from either side towards the zero position in which the velocity of the driven member corresponding to the voltage output is zero. In this arrangement, it will be realised that since the position of the demand element determines the speed of the driven member, the actual positioned movement of such driven member depends also on the time period for which the demand element is maintained in the operative position. The zero position tapping effectively divides the potentiometer into two parts associated with movement of the driven member respectively in the two opposite directions, and accordingly the feed-back means may conveniently act to control the effective transmission ratios of the two parts in the manner previously mentioned. For this purpose for example, the feed-back means may be electrical and constituted by a potentiometer connected in parallel with the demand potentiometer and having a contact movable on either side of a zero position in accordance with the position of the driven member, such movable contact being maintained at a constant potential which is the same as that of the zero position tapping of the demand potentiometer. In this case, the feedback means acts, by controlling the supply voltage thereto, to provide an over-riding control on the electrical transmission device to determine the voltage thereof at least at the end portions of the range of travel of the driven member. However, the feed-back means may act to provide an over-riding control on the electrical transmission device in other arrangements also.

In an alternative arrangement, the transmission means comprises an electrical device responsive to the speed of movement of the demand element and providing a voltage ouput dependent on such speed, and an electrically energised prime-mover for driving the driven member and whose speed is dependent on a voltage derived from the voltage output of the electrical transmission device under the control, at least at the end portions of the range of travel, of the feed-back means. For example, such electrical transmission device may be constituted by a tacho-generator. In this connection, it should be mentioned that a tacho-generator is a generator which, over a wide speed range from zero up to several thousand revolutions per minute, gives an electrical output voltage approximately proportional to its speed. With this arrangement also, it should be mentioned that over a period of time no precise positional relationship is maintained between the demand element and the driven member, for in contrast with position-controlling transmission means, any error in such positional relationship is not made up after the demand element is stopped.

In the alternative arrangement also, the feed-back means may conveniently be electrical and include a potentiometer having a contact movable on either side of the zero position in accordance with the position of the driven member.

Furthermore, such feed-back potentiometer or other feed-back means may conveniently act to attenuate the valtage output of the electrical transmission device to determine the voltage input to the prime-mover at least at the end portions of the range of travel of the driven member. In this case, the feed-back potentiometer in effect acts to provide a feed-back voltage for opposing the output voltage of the electrical transmission device, at least at the end portions of the range of travel, thereby to control the speed of the prime-mover.

In either of the above-mentioned arrangements, the electrically energised prime-mover may conveniently be constituted by a reversible electric motor forming part of a servo-device which additionally comprises a tacho-generator driven by the motor and whose voltage output cooperates with that of the electrical transmission device in providing the derived voltage on which the speed of the motor is dependent.

In the arrangements employing a prime-mover for driving the driven member, the use of the above-described control device has the further advantage that risk of overheating is avoided due to such prime-mover being maintained in a stalled condition because the operator calls for further movement of the driven member beyond its limit of travel.

If desired, the feed-back means may be rendered operative at least to a material extent, only at the end portions of the range of travel of the driven member, but alernatively such feed-back means may be operative throughout such range of travel, compensating means being provided whereby the transmission ratio in the transmission means is rendered substantially unaffected by such feed-back means over the major portion of the range of travel.

The above-described control device may conveniently be applied to controlling an optical objective of the zoom type, the demand element constituting the zoom control element and the driven member constituting a member through which the drive is applied to a part of the objective movable for zooming. In this case, for example when the zoom objective forms part of a television camera, the control device has the advantages of minimising noise effects due to impact with the end stops at the ends of the range of zoom and also of terminating zoom more satisfactorily from the point of view of appearance.

The control device may be used with generally similar advantages for controlling any optical objective, including a zoom objective, having a part movable for focussing under the control of a focussing control element.

Further features of the invention will be apparent from the practical arrangement of control device now to be described by way of example with reference to the accompanying drawings, for convenience with reference also to its application in controlling an optical objective of the zoom type. In the drawings, FIGURE 1 shows, in diagrammatic form, a television camera having a zoom objective and with the control device, which constitutes the zoom transmission means, mounted thereon, FIGURE 2 shows, again diagrammatically, a practical arrangement of the control device of FIGURE 1, FIGURE 3 shows a modification of the camera of FIG-1 wherein the control device constitutes the focussing transmission means, FIGURE 4 shows a practical arrangement of the control device of FIGURE 3, FIGURE 5 shows an arrangement of wholly mechanical control device constituting zoom transmission means, and FIGURE 6 shows an arrangement of partly hydraulic control device constituting focussing transmission means.

Usually, zoom objectives consist of a front assembly including the members relatively movable for zooming purposes, and a rear assembly which remains stationary during the zooming movements. In the majority of such zoom objectives there are two relatively movable members, but in some instances there are three such members. In the arrangement of FIGURE 1, which shows a television camera A having a zoom objective B, such objective has two members $B^1$ and $B^2$ relatively movable for zooming in front of a stationary rear member $B^3$ and behind a front member $B^4$. Transmission means are provided whereby, under the control of a zoom control element, the equivalent focal length of the objective can be continuously varied throughout a range, whilst maintaining constant position of the image plane, whereby the size of the image can be varied. For effecting zooming, at least one of the movable members $B^1$ and $B^2$ has to perform a movement bearing a non-linear relationship to the movement of the zoom control element, and this necessitates the use of some form of cam device. This cam device is incorporated, in one or other of a variety of ways, in the mechanical drive from a member $B^5$, driven with movement bearing a predetermined relationship to that of the zoom control element, to the movable members $B^1$ and $B^2$ of the objective B. The arrangement now to be described is concerned with the transmission from the zoom control element to the member $B^5$ through which the drive is applied to the movable members $B^1$ and $B^2$ of the objective B.

In this arrangement, the zoom control element is constituted by a hand lever C displaceable on either side of a normal zero position into which such lever is urged by means of a spring $C^1$. Such hand lever C controls a potentiometer D having an earthed centre tapping $D^1$ and a movable contact $D^2$ linked with the hand lever so that the output voltage taken from such contact depends in sense and magnitude on the position of its movable contact, such output being zero in the zero position of the hand lever. As shown in FIGURE 2, the ends of the potentiometer D are connected across a suitable direct-current or alternating-current source assumed to have balanced negative and positive poles. The output voltage of the potentiometer D is applied to means controlling the speed and direction of movement of the driven member $B^5$, i.e. the member driving the movable members $B^1$ and $B^2$ of the objective B, in accordance with such voltage.

In the television camera shown in FIGURE 1, having the objective B at its front, the above-described hand lever C may conveniently be mounted on a small casing $A^1$ at the rear of the camera A, such casing $A^1$ housing the potentiometer D, the connecting drive $C^2$ from the hand lever to such potentiometer, and the return spring $C^1$. The means controlling the movement of the driven member $B^5$ comprises an electrical speed controlling servo-device contained in a small housing $A^2$ to the side of the objective B at the front of the camera A. This servo-device comprises a reversible electric motor E and a tacho-generator $E^1$ having an input shaft $E^2$ rigid with the output shaft of the motor, the motor output being taken from this shaft $E^2$ through suitable reduction gearing $E^3$ so as to drive the driven member $B^5$. In FIGURE 1, the sizes of the casing $A^1$ and housing $A^2$ and the parts within them are exaggerated for clarity.

The servo-device also includes a high gain multi-stage amplifier F (see FIGURE 2), to which is applied not only the output voltage of the demand potentiometer D controlled by the demand element, i.e. the zoom control hand lever C, but also, in opposition thereto, the output voltage of the tacho-generator $E^1$ driven by the motor E.

The operation of this transmission means, as so far described, will now in turn be described on the assumption that the output voltage of the demand potentiometer D is dependent solely on the position of its movable contact $D^2$, so that such voltage is dependent, not necessarily in linear proportional relationship, on the displacement of the hand lever C from its zero position. The arrangement, in this circumstance, constitutes a speed-controlling servo-device in which the speed of the driven member $B^5$ is dependent on the position of the hand lever C relative to the zero position, so that the actual positional movement of the driven member depends not only on the position to which such hand lever is moved but also on the period for which the hand lever is maintained in such position. The voltage applied to the motor E constitutes a correcting voltage, as is usual in a servo-device, and causes the speed of the motor precisely to follow the position of the hand lever C, such correcting voltage being constituted by the difference, after amplification in the amplifier F, of the output voltage of the demand potentiometer D and the output voltage of the tacho-generator $E^1$. When the hand lever C is released automatically to return to its zero position, the driven member $B^5$ is stopped substantially simultaneously therewith owing to the immediate application of a substantial reversing voltage to the motor E. The avoidance of a time lag on stopping, which time lag is characteristic of a position-controlling servo-device, is advantageous, especially since the operator of a camera fitted with a zoom lens invariably works from a monitor or other viewing screen. Thus, with the described arrangement, the operator may press the hand lever C to an extent appropriate to the speed of zoom required, and release such lever as soon as the desired zoom effect has been achieved, without the necessity of trying to anticipate further movements which, with position-controlling servo-devices, take place due to time lag. In contrast with a position-controlling servo-device however, it will be realised that there is no relationship between the position of the demand element C and the position of the driven member $B^5$, and that even though watching the monitor screen, the operator may easily try to move the driven member beyond the limits of its range of travel, as determined by suitable end stops. The impact with an end stop, especially if at high speed when the operator is calling for fast zooming, may easily result in damage to the movable members $B^1$ and $B^2$ of the objective B or the mechanical transmission thereto from the member $B^5$. Furthermore, the noise and the effect on the picture resulting from such sudden impact is also undesirable, as also is risk of overheating of the motor E due to prolonged stalling thereof if the operator continues to call for further zooming.

Accordingly, for appreciably decelerating the driven member at the ends of its range of travel, an over-riding control is applied to the demand potentiometer D. For this purpose, a feed-back is employed in the form of a potentiometer G having a contact $G^1$, movable on either side of a zero position, in approximately proportional relationship to the position of the driven member $B^5$ about a central position thereof. The feed-back potentiometer G is connected in parallel with the demand potentiometer D across the source, two load resistors H being series-connected in the respective supply leads from such source to such two potentiometers. The movable contact $G^1$ of the feed-back potentiometer G is connected to the same potential as centre tapping $D^1$ of the demand potentiometer D, and is therefore earthed in the case of a source having balanced positive and negative poles. When the hand lever C is displaced to cause the movable contact $D^2$ to move towards the positive end of the demand potentiometer D, the resultant movement of the driven member $B^5$ causes the movable contact $G^1$ of the feed-back potentiometer G to move towards the positive end thereof, and vice versa. The movable contact $G^1$ of the feed-back potentiometer G is arranged to reach the respective ends thereof just as the driven member $B^5$ reaches the ends of its range of travel.

The above-described arrangement operates in similar manner when the hand lever C is moved to effect movement of the contact $D^2$ of the demand potentiometer D whether to the positive end or to the negative end thereof, i.e. in accordance with zooming to wider or to narrower angle. Whatever the position to which the hand lever C is moved, say to move the contact $D^2$ of the demand potentiometer D towards the positive end thereof, let it be assumed that such lever is maintained in such position for a sufficient period to cause the driven member $B^5$ to approach its limit of travel in the appropriate direction. The further such lever C is displaced from its zero position, the faster is the rate of zoom demanded and effected, and thus the shorter is the period taken by the driven member $B^5$ to approach its limit of travel. As the driven member $B^5$ approaches such limit, so the contact $G^1$ of the feed-back potentiometer G is moved towards the positive end of such potentiometer, and, assuming a constant position of the hand lever C, an increasingly greater current is taken by the winding of such feed-back potentiometer on the positive side of its earthed contact, whilst a correspondingly smaller current is taken by the winding of the demand potentiometer D on the positive side of its earthed central point $D^1$. The positive output voltage taken from the movable contact $D^2$ of the demand potentiometer D is thereby reduced, and a reduction in the speed of the servo-device, and thus of the driven member $B^5$, results. When the earthed contact $G^1$ of the feed-back potentiometer G reaches the positive end thereof, the voltage ouput of the demand potentiometer D drops substantially to zero. This is true irrespective of the position of the movable contact $D^2$ on the positive side of the demand potentiometer D. When the output of the demand potentiometer D falls substantially to zero, the servo-device is substantially simultaneously brought to rest or at least decelerated to a very small velocity, and the driven member $B^5$ is stopped at the desired limit of travel, any impact with the end stop being at very low speed in no way harmful.

Two points should be made clear. Firstly, if the hand lever C is not held in position long enough for the driven member $B^5$ to approach its limit of travel, then when released, such hand lever automatically returns to its zero position and the movable contact $D^2$ of the demand potentiometer D returns to the central earthed point $D^1$ thereof to effect stopping of the servo-device substantially simultaneously. In this instance the hand lever C may subsequently be moved, either to effect further zooming movement in the same direction or to effect zooming movement in the opposite direction. Secondly, if the hand lever C is maintained in position until the limit of travel is reached, such lever still returns to its zero position when released, and the movable contact $D^2$ of the demand potentiometer D returns to the earthed central point $D^1$ thereof. However, since the position of the movable contact $G^1$ of the feed-back potentiometer G remains unchanged, one side of the demand potentiometer D remains effectively dead and it is not possible to effect further zooming movement in the same direction. However, the other side of the demand potentiometer D remains fully operative ready for zooming movement in the opposite direction.

The operation of the above arrangement has been described for explanatory purposes without reference to the relationship between the magnitudes of the resistances of the load resistors H and the windings of the potentiometers D and G, but in practice this relationship is of considerable importance. Thus, it will be appreciated that the feed-back potentiometer G has a progressive effect on the output of the demand potentiometer D throughout the range of travel of the driven member $B^5$, so that when the hand lever C is held in the same position for a period, the rate of zoom effected is not substantially constant but progressively decreases from the moment the desired demand velocity has been reached. However, by choosing the relationship between the above-mentioned resistances appropriately, and especially so that the resistance of the feed-back potentiometer G is high in relation to the resistance of the demand potentiometer D, it may be arranged that, for the major portion of the range of movement of the earthed contact $G^1$ of the feed-back potentiometer, negligible or very small voltage change occurs at the ends of the demand potentiometer D, but at the end portions of the range of travel, the voltage at the ends of the demand potentiometer rapidly falls to zero at the required limits of travel. With this arrangement, the output voltage of the demand potentiometer, and thus the rate of zoom effected, is dependent substantially solely on the displacement of the hand lever C for the major portion of the range of travel. However, even though the hand lever C is maintained in its operative position, the output voltage of the demand potentiometer D rapidly falls to zero to stop the zoom movement at relatively short end portions of such range of travel.

A modified arrangement may additionally utilise a feed-back potentiometer G having a winding of very high resistance over the major portion of its length corresponding to the major portion of the range of travel of the driven member $B^5$, and of low resistance at its end portions.

It is alternatively possible, as will be clear without further illustration, to employ feed-back means only brought into operation at the ends of the range of travel of the driven member. For this purpose, for example, the feed-back potentiometer G may be formed in two spaced parts, respectively positive and negative, so that the earthed contact $G^1$ thereof is not connected in circuit over the major portion of the travel range but moves along an insulating spacer for this period. Yet again, a cam device or slip device may be employed in the drive between the driven member $B^5$ and the movable contact $G^1$ of the feed-back potentiometer G, whereby such contact is only moved, at least to an appreciable extent, over the end portions of the range of travel.

It will be clear that, in the above-described arrangement, it is possible to replace the centre-tapped demand potentiometer D by two separate potentiometers if desired, with further minor circuit modifications.

The above-described arrangement, which may operate on either an alternating-current or a direct-current basis, may also be modified in various other ways within the scope of the invention. For example, one alternative arrangement is shown in FIGURE 3, wherein the control device is applied to the transmission to the front member $B^4$ of the zoom objective B, such front member being movable for focussing under the control of a focussing control element which constitutes the demand element. In this arrangement, the demand element is in the form of a hand wheel J and the demand potentiometer is replaced by a tacho-generator K driven by the hand wheel through suitable gearing $J^1$ and producing an output voltage generally proportional in magnitude to its speed and dependent in sense on its direction of rotation. This output voltage is applied to means controlling the speed of movement of the driven member, for example the previously described servo-device (see FIGURE 4). With this form of control, the driven member $B^6$, for driving the movable part $B^4$ of the objective, is moved at a speed approximately proportional to the speed of the hand wheel J, and is stopped substantially simultaneously with the stopping of such hand wheel. However, any error in positional relationship between the hand wheel J and the driven member $B^6$, for example due to saturation of the servo-device, is not made up after the hand wheel is stopped, so that over a period there is no predeterminable positional relationship between the hand wheel and the driven member. It is therefore possible for the operator to continue to turn the hand wheel J to try and effect further movement of the driven member $B^6$ beyond the limit of travel thereof. Thus, for stopping such driven member $B^6$ at the required limit, feed-back means generally similar to the previously described feed-back potentiometer may be employed. In this instance, however, as shown in FIGURE 4, such potentiometer G is preferably utilised in effect to provide a feed-back voltage which is applied to the amplifier F of the servo-device to control the speed of the motor in conjunction with the output voltage of the tacho-generator K.

For this purpose, the potentiometer G is associated with a pair of Zener diodes $L^1$ and $L^2$ in the manner shown. In operation, as the driven member $B^6$ approaches one end limit of its travel, so the movable contact $G^1$ of the feed-back potentiometer G, which contact is in this arrangement not earthed, approaches one end (say the upper end) of the winding of such potentiometer. At this time, current flowing from the tacho-generator K to the servo-device through the load resistor $H^1$ finds an alternative low impedance path to earth through the end portion of the winding of the feed-back potentiometer G and the Zener diode $L^1$ connected at such end of the potentiometer. Thus, the voltage available to operate the servo-device is reduced and the driven member $B^6$ decelerates. However, if the hand wheel J is now turned in the opposite direction to move the driven member $B^6$ in the opposite direction for further focussing purposes, the current flow through the load resistor $H^1$ is in effect in the opposite sense and a low impedance path to earth is not found, since the diode $L^1$ presents a high impedance path to such current flow in the opposite sense. Thus the servo-device operates at full speed to move the member $B^6$ away from the end stop. The Zener diode $L^2$ acts in a similar manner when the member $B^6$ is driven to its other limit of travel. In this modified arrangement, it may be desirable to clip the voltage output of the tacho-generator K by means of a pair of Zener diodes connected back to back in parallel with such tacho-generator, as indicated at M. In FIGURES 3 and 4, the same reference letters are employed as in FIGURES 1 and 2 for parts not specifically referred to, and the broken line $B^7$ indicates the common shaft of the motor E and tacho-generator $E^1$ in the servo-device. In the last-described arrangement, the feed-back may alternatively be applied for example directly to the amplifier at a push-pull stage thereof. Again, the feed-back may be applied to an auxiliary winding of the tacho-generator K to control the output voltage thereof at least at the end portions of the range of travel. As with the arrangement of FIGURES 1 and 2, means may be provided whereby the feed-back potentiometer G is rendered effectively operative only at the end portions of the range of travel of the driven member.

In either of the above-described arrangements, means other than the described servo-device may be employed to control the speed of the driven member. For example, in an alternative arrangement (not shown) operating on a direct-current basis, an analogous device is employed which comprises a reversible direct-current motor connected in one arm of a bridge circuit also comprising resistances and a compensating inductance for the motor. An amplifier has two inputs, respectively positive and negative, to which are applied positive and negative outputs, from the demand potentiometer or from the demand tacho-generator according to the form of hand control employed, and also negative and positive feed-backs from two opposite corners of the bridge circuit. The output of the amplifier is taken to a third corner of the bridge circuit, the fourth corner being earthed. With this arrangement, the feed-back to the amplifier is representative of the back electro-motive-force of the motor, which is dependent on the speed thereof. With a hand lever control, a feed-back potentiometer is used as an over-riding control for the demand potentiometer at the ends of the range of travel, whilst with a hand wheel control, the output of the feed-back potentiometer is applied, as a second feed-back, to the amplifier. This arrangement is typical of a number of ways in which a feed-back circuit may be employed to cause a correcting voltage to be applied to the motor to govern the speed thereof in relation to the position or speed of the hand control, without requiring the use of a tacho-generator coupled with such motor.

The arrangements so far described are similar to one another in that the transmission between the demand element and the driven member is effected by means of electrical speed controlling means, and the feed-back means for limiting the travel of the driven member is constituted by a potentiometer. However, the transmission means may alternatively include a variable speed gear interposed in the drive between the normal output shaft of the transmission means and the driven member, such variable speed gear being brought into operation by mechanical feed-back means only at the end portions of the range of travel so as to act appreciably to decelerate the driven member from the demanded velocity. By use of two such variable speed gears, or alternatively two variable-slip clutches, one for drive in one direction and one for drive in the other direction, it may be arranged that, at each end portion of the range of travel, the transmission ratio for drive in the reverse direction remains substantially unaffected. The variable speed gear or gears may be of any convenient conventional form if desired with an additional extreme end position in which transmission is completely broken.

FIGURE 5 shows by way of example an arrangement having wholly mechanical transmission, the zoom control element being in the form of a hand wheel N acting through a variable speed gear and further gearing $N^1$ to drive the member $B^5$ which in turn drives the members $B^1$ and $B^2$ of the objective B movable for zooming. The variable speed gear is of the well-known kind having two oppositely directed rotatable cones $N^2$ disposed side by side, the effective transmission ratio between them being dependent on the position of an intermediate part $N^3$ slidable between such cones. For the purpose of moving the intermediate part $N^3$ to alter the transmission ratio, such part $N^3$ is mounted on an inclined rack element P driven by a pinion gear $P^1$. Means are introduced whereby the pinion gear $P^1$ is driven to move the rack P and thus alter the transmission ratio of the cone gears $N^2$ only at the end portions of the range of travel of the member $B^5$, such means being in the form of a mechanical feed-back from such member. Thus the member $B^5$ drives a shaft Q on which are mounted a pair of driving cams $Q^1$ and $Q^2$ frictionally engaging driven elements $Q^3$ and $Q^4$ respectively. The driven elements $Q^3$ and $Q^4$ engage through gearing $Q^5$ and $Q^6$ with a driving gear $Q^7$ on the shaft of the pinion gear $P^1$, the gearing $Q^6$ including a reversing gear. With this arrangement, the intermediate part $N^3$ of the variable speed gear normally lies in the position shown so that, for a given speed of rotation of the hand wheel N, the member $B^5$ is driven at the maximum possible speed. However, as the member $B^5$ approaches one of its end stops, one of the cams $Q^1$ and $Q^2$ is brought into operation to drive the pinion gear $P^1$ and thus to move the intermediate part $N^3$ of the variable speed gear to the position in which, for the same speed of rotation of the hand wheel N, the member $B^5$ is driven at the minimum possible speed. The arrangement shown has the disadvantage that, when the hand wheel N is turned in the reverse direction to move the member $B^5$ away from its limit of travel, such movement of the member $B^5$ is not immediately effected at the maximum possible speed. However, this can be overcome by substantially duplicating the drive shown in FIGURE 5, transmission in one direction being effected through one variable speed gear and transmission in the other direction being effected through another variable speed gear. Each variable speed gear is associated with a feed-back drive through a cam, each such cam for causing the transmission ratio of such variable speed gear to be altered at one end only of the range of travel. With this modified arrangement, while the member $B^5$ is being driven from its end stop in one direction through one variable speed gear, the cam associated with the other variable speed gear, operative for drive in the reverse direction, is causing the intermediate part of such other variable speed gear to be returned to its normal position.

When such mechanical feed-back means is employed, the speed-controlling transmission means may be partly or wholly hydraulic. When hydraulic transmission is employed, the feed-back means may act for example to vary the angle of a swash plate in the well-known manner, a device being provided if desired for breaking such hydraulic transmission completely at the extreme limits of travel. Such swash plate, or alternatively a variable fluid supply valve, is linked with the driven member through the feed-back means so as to be brought into operation only at the end portions of the range of travel. FIGURE 6 shows a simple arrangement employing hydraulic transmission wherein a pump Q is operable under the control of the focussing control element (not shown) to operate a cylinder and piston assembly which drives through suitable gearing T the member $B^6$ which in turn drives the member $B^4$ of the objective movable for focussing. In the hydraulic transmission, a small cylinder and piston V and $V^1$ respectively operate in parallel with a large cylinder and piston $V^2$ and $V^3$ respectively, the two pistons $V^1$ and $V^3$ being mechanically linked to move together. The cylinder $V^2$ has a by-pass passage $V^4$ connecting its inlet with the remote end of the cylinder on the side of the piston $V^4$ remote from the inlet. The effective transmission ratio of this system is varied by cutting into or out of operation the large cylinder and piston $V^2$ and $V^3$. Thus, the inlet to this cylinder $V^2$ incorporates a switch-over valve $V^5$ which is operated, when the member $B^6$ approaches its limit of travel in either direction, by means of a mechanical feed-back from such member including a cam W. Normally, i.e. over the major portion of the range of travel of the member $B^6$, the large cylinder and piston $V^2$ and $V^3$ are cut out of operation, the valve $V^5$ acting to connect the two ends of the cylinder $V^2$ together and to block such cylinder off from the pump flow and return. However, as the member $B^6$ approaches one of its limits of travel, the cam W is brought into operation to switch the valve $V^5$ to a position in which the cylinder $V^2$, as well as the cylinder V, is connected to the pump flow and return. At this time, for an unchanged movement of the focussing control element, the speed of movement of the member $B^6$ is appreciably reduced. As before, the part of the transmission means linked with the feed-back means may be duplicated respectively for drive in the two opposite directions in order that full transmission power is available for driving the member $B^6$ away from the end stops at the end portions of the range of travel.

It is also to be appreciated that the above-described arrangements of control device may be applied to various purposes other than the control of an optical objective of the zoom type or an optical objective having a movable focussing member, but may be employed in any instance where a demand element is required to control the speed of a driven member and it is desirable to avoid high speed impact with end stops at the limits of travel.

What I claim as my invention and desire to secure by Letters Patent is:

1. A control device wherein movement of a demand element controls movement of a driven member in each of two opposite directions over a limited range of travel, comprising the demand element, transmission means acting under the control of the demand element to control the speed of movement of the driven member in each direction, such transmission means including a transmission device having a variable transmission ratio, feed-back means from the driven member to said transmission device, means whereby such feed-back means is responsive to the position of the driven member and acts to control the transmission ratio of said transmission drive in such a manner that the driven member is caused to decelerate from the demanded velocity at least to a relatively small velocity at the end portion of its range of travel, and means whereby the feed-back means acts, at each end portion of the range of travel of the driven member, to control only the effective transmission ratio governing movement of the driven member in the direction towards the extreme end of such portion, and does not substantially affect the effective transmission ratio governing return movement of the driven member in the direction towards the remote end of its range of travel.

2. A control device as claimed in claim 1, in which the transmission means comprises an electrical device responsive to the speed of movement of the demand element and providing a voltage output dependent on such speed, and an electrically energised prime-mover for driving the driven member and whose speed is dependent on a voltage derived from the voltage output of the electrical transmission device under the control, at least at the end portions of the range of travel, of the feed-back means.

3. A control device as claimed in claim 2, in which the electrical device responsive to the demand element is constituted by a tacho-generator giving an electrical output voltage approximately proportional to its speed of movement.

4. A control device as claimed in claim 3, in which the feed-back means acts to attenuate the voltage output of the electrical transmission device to determine the voltage input to the prime-mover at least at the end portions of the range of travel of the driven member.

5. A control device as claimed in claim 1, in which the transmission means includes a transmission device having two unidirectional transmission parts by means of which the speed of movement of the driven member is controlled respectively in the two opposite directions, and the feed-back means acts at one end portion of the range of travel to control the effective transmission ratio of one unidirectional part of such transmission device whilst not affecting the effective transmission ratio of the second part, and acts at the other end portion of the range of travel to control the effective transmission ratio of the second unidirectional part of such transmission device whilst not affecting the effective transmission ratio of the first part.

6. A control device as claimed in claim 1, in which the transmission means comprises an electrical device responsive to the position of the demand element on either side of a zero position thereof and providing a voltage output dependent on such position, and an electrically energised prime-mover for driving the driven member and whose speed is dependent on a voltage derived from the voltage output of the electrical transmission device under the control, at least at the end portions of the range of travel, of the feed-back means.

7. A control device as claimed in claim 6, in which the electrical transmission device comprises a demand potentiometer having a contact movable on either side of a zero position tapping in accordance with the position of the demand element and giving a voltage output depedent on such position, the movable contact of such potentiometer being urged from either side towards the zero position in which the velocity of the driven member corresponding to the voltage output is zero.

8. A control device as claimed in claim 7, in which the feed-back means acts at least at the end portions of the range of travel of the driven member to provide an overriding control on the electrical transmission device to determine the voltage output thereof.

9. A control device wherein movement of a demand element controls movement of a driven member in each of two opposite directions over a limited range of travel, comprising transmission means acting under the control of the demand element to control the speed of movement of the driven member in each direction, such transmission means including an electrical driving device for driving the driven member, electrical means responsive to the position of the demand element on either side of a zero position thereof and providing a voltage output dependent on the position of the demand element, means for applying to the driving device a voltage derived at least in part from such voltage output whereby the speed of the driving device is primarily dependent on such voltage output, feed-back means responsive to the position of the driven member, and means whereby such feed-back means acts at the end portions of the maximum range of travel of the driven member to reduce the voltage applied to the driving device and thereby to reduce the speed of such device at least to a relatively small value.

10. A control device as claimed in claim 9, in which the said electrical means comprises a demand potentiometer having a contact movable in either direction from a zero position in accordance with the position of the demand element and giving a voltage output dependent on the position of the contact, and means whereby when the demand element is released such contact returns to the zero position wherein the voltage output is zero.

11. A control device as claimed in claim 10, in which the feed-back means comprises a potentiometer connected in parallel with the demand potentiometer and having a contact movable in either direction from zero position in accordance with the position of the driven element, such contact being maintained at the same potential as the zero point of the demand potentiometer, the arrangement being such that the contact will substantially reach the end of the potentiometer when the driven member reaches the corresponding end of its maximum range of travel and will thereby virtually short-circuit the half of the demand potentiometer occupied by the contact thereon when driving the driven member towards the said end of its range of travel.

12. A control device as claimed in claim 9, in which the electrical driving device is constituted by a reversible electric motor forming part of a servo-device, which comprises in addition to the motor, a tachogenerator driven by the motor, an amplifier whose output is applied to the motor for determining the speed thereof, and means whereby the amplifier input is energized by the opposed voltage outputs of the said electrical means and of the tachogenerator.

13. A control device wherein movement of a demand element controls movement of a driven member in each of two opposite directions over a limited range of travel, comprising transmission means acting under the control of the demand element to control the speed of movement of the driven member in each direction, an electrical driving device for driving the driven member, electrical means responsive to the speed of movement of demand element and providing a voltage output dependent on such speed, means for applying to the driving device a voltage derived at least in part from such voltage output whereby the speed of the driving device is primarily dependent on such voltage output, feed-back means responsive to the position of the driven member, and means whereby such feed-back acts at the end portions of the maximum range of travel of the driven member to reduce the voltage applied to the driving device and thereby to reduce the speed of such device at least to a relatively small value.

14. A control device as claimed in claim 13, in which the said electrical means is constituted by a tachogenerator driven by the demand element and giving an output voltage approximately proportioned to its speed of movement.

15. A control device as claimed in claim 14, in which the electrical driving device is constituted by a reversible electric motor forming part of a servo-device, which comprises in addition to the motor, a tachogenerator driven by the motor, an amplifier whose output is applied to the motor for determining the speed thereof, and means whereby the amplifier input is energized by the opposed voltage outputs of the two tachogenerators.

16. A control device as claimed in claim 13, in which the feed-back means comprises a potentiometer having a contact movable in either direction from zero position in accordance with the position of the driven member, and two opposed diodes respectively connected to the ends of such potentiometer to determine the direction of current flow.

References Cited by the Examiner
UNITED STATES PATENTS

| | | | |
|---|---|---|---|
| 2,464,220 | 3/1949 | Duncan | 88—24 |
| 2,871,716 | 2/1959 | Stade | 74—472 |
| 3,016,778 | 1/1962 | Fitzner | 74—472 X |
| 3,165,044 | 1/1965 | Heinmelsbach | 95—45 |

DAVID J. WILLIAMOWSKY, *Primary Examiner.*

JOHN M. HORAN, *Examiner.*